(12) United States Patent
Rasheed et al.

(10) Patent No.: US 12,249,123 B2
(45) Date of Patent: Mar. 11, 2025

(54) SYSTEM AND METHOD FOR RARE OBJECT LOCALIZATION AND SEARCH IN OVERHEAD IMAGERY

(71) Applicant: Novateur Research Solutions, Ashburn, VA (US)

(72) Inventors: Zeeshan Rasheed, Great Falls, VA (US); Jonathan Jacob Amazon, Haymarket, VA (US); Khurram Hassan-Shafique, Aldie, VA (US)

(73) Assignee: Novateur Research Solutions, Ashburn, VA (US)

( * ) Notice: Subject to any disclaimer, the term of this patent is extended or adjusted under 35 U.S.C. 154(b) by 375 days.

(21) Appl. No.: 17/877,415

(22) Filed: Jul. 29, 2022

(65) Prior Publication Data

US 2023/0050679 A1    Feb. 16, 2023

Related U.S. Application Data

(60) Provisional application No. 63/227,051, filed on Jul. 29, 2021.

(51) Int. Cl.
*G06V 10/77* (2022.01)
*G06F 16/51* (2019.01)
(Continued)

(52) U.S. Cl.
CPC .......... *G06V 10/7715* (2022.01); *G06F 16/51* (2019.01); *G06F 16/532* (2019.01);
(Continued)

(58) Field of Classification Search
CPC ............. G06V 10/7715; G06V 10/758; G06V 10/7753; G06V 10/82; G06V 20/10; G06V 20/13; G06F 16/51; G06F 16/532
See application file for complete search history.

(56) References Cited

U.S. PATENT DOCUMENTS

2018/0157916 A1* 6/2018 Doumbouya ........ G06V 40/103
2018/0330198 A1* 11/2018 Harary ................. G06V 10/44
(Continued)

OTHER PUBLICATIONS

Kan et al., A supervised learning to index model for approximate nearest neighbor image retrieval, 2019, Signal Processing: Image Communication, 78 (2019): 494-502. (Year: 2019).*
Lin et al, Feature Pyramid Networks for Object Detection, 2017, IEEE Conference on Computer Vision and Pattern Recognition, pp. 1-10. (Year: 2017).*
(Continued)

*Primary Examiner* — Kathleen M Broughton
(74) *Attorney, Agent, or Firm* — Rahman LLC

(57) ABSTRACT

A feature extractor and novel training objective are provided for content-based image retrieval. For example, a computer-implemented method includes applying a query image and a search image to a neural network of a feature extraction network of a computing device, the query image indicating an object to be searched for in the search image. The feature extraction network includes the neural network, a spatial feature neural network receiving a first output of the neural network pertaining to the search image, and an embedding network receiving a second output of the neural network pertaining to the query image. The method includes generating spatial search features from the spatial feature neural network, generating a query feature from the embedding network, applying the query feature to an artificial neural network (ANN) index, and determining an optimal matching result of an object in the search image based on an operation using the ANN index.

23 Claims, 12 Drawing Sheets
(9 of 12 Drawing Sheet(s) Filed in Color)

(51) Int. Cl.
  *G06F 16/532* (2019.01)
  *G06V 10/75* (2022.01)
  *G06V 10/774* (2022.01)
  *G06V 10/82* (2022.01)
  *G06V 20/10* (2022.01)

(52) U.S. Cl.
  CPC ........ *G06V 10/758* (2022.01); *G06V 10/7753* (2022.01); *G06V 10/82* (2022.01); *G06V 20/10* (2022.01)

(56) References Cited

U.S. PATENT DOCUMENTS

| | | | | |
|---|---|---|---|---|
| 2019/0171665 | A1* | 6/2019 | Navlakha | G06V 10/761 |
| 2019/0251184 | A1* | 8/2019 | Shan | G06N 3/045 |
| 2022/0108204 | A1* | 4/2022 | Du | G06N 3/04 |
| 2022/0374625 | A1* | 11/2022 | Chu | G06N 20/10 |

OTHER PUBLICATIONS

Arulmozhi et al, A comparative study of hash based approximate nearest neighbor learning and its application in image retrieval, 2017, Artif Intell Rev, 52 (2019): 323-355. (Year: 2017).*

Chiu et al, Learning to Index for Nearest Neighbor Search, 2020, IEEE Transactions on Pattern Analysis and Machine Intelligence, 42 (8): 1942-1956. (Year: 2020).*

Berman et al, MultiGrain: a unified image embedding for classes and instances, 2019, arXiv: 1902.05509v2, pp. 1-13. (Year: 2019).*

Cheng et al, G-Fusion: LiDAR and Camera Feature Fusion on the Ground Voxel Space, 2024, IEEE Acces (99): 1-13. (Year: 2024).*

Yokoo et al, Two-stage Discriminative Re-ranking for Large-scale Landmark Retrieval, 2020, IEEE/CVF Conference on Computer Vision and Pattern Recognition Workshop, pp. 1-9. (Year: 2020).*

Franco et al, Vehicle Re-Identification by Deep Feature Embedding and Approximate Nearest Neighbors, 2020, pp. 1-9. (Year: 2020).*

* cited by examiner

SYSTEM AND METHOD FOR RARE OBJECT LOCALIZATION AND SEARCH IN OVERHEAD IMAGERY

This invention was made with government support under U.S. Government Contract Number HM0476-19-C-0085 awarded by National Geospatial-Intelligence Agency. The government has certain rights in the invention.

FIELD OF THE INVENTION AND BACKGROUND

The present disclosure pertains to a feature extractor and novel training objective for content-based image retrieval. Specifically, the system and method of the present disclosure combine a semantic matching objective with a ranking objective to produce a feature extractor that is able to retrieve semantically relevant regions from a large search corpus. It further ranks them appropriately according to visual similarity. Furthermore, the system and method of the present disclosure provide a mechanism for performing one-shot and even zero-shot object localization without the need to fine-tune the feature extraction model or re-index the corpus of search features. This disclosure demonstrates the capabilities of the system and method in the context of object localization in satellite imagery. Quantitative and qualitative results are provided that show robust domain transfer between satellite image optics and sensor modalities. The disclosure also shows good precision and search relevance ordering when returning areas of interest to specific object classes.

Content-based image retrieval (CBIR) has long been a subject of interest in computer vision and multimedia research. Given a query image, the goal of CBIR is to efficiently retrieve the most relevant visual content from large search sets that accurately reflect the content of the query image. Broadly, CBIR approaches can be categorized into two categories, instance level and category level. The former deals with the problem of finding other instances of a specific object or a scene (e.g., landmarks such as the Big Ben) depicted in a query image, while the latter focuses on the problem of finding images depicting the objects of the same class as in the query image (e.g., airplanes, boats, etc.). Most of the existing literature on CBIR focuses on the former problem, i.e., instance level retrieval, whereas the problem of category-level retrieval is usually implemented using techniques such as object detection and classification. Moreover, most of the approaches in both instance-level and category-level CBIR are applied to situations where the visual content in both the query image and the search images are generated in a similar way, for example, when querying a database of ground-level images using another ground-level image taken with a personal camera.

SUMMARY

A computer-implemented method includes applying a query image and a search image to a neural network of a feature extraction network of a computing device, the query image indicating an object to be searched for in the search image, wherein the feature extraction network includes the neural network, a spatial feature neural network coupled to receive a first output of the neural network pertaining to the search image, and an embedding network coupled to receive a second output of the neural network pertaining to the query image, generating spatial search features from the spatial feature neural network, generating a query feature from the embedding network, applying the query feature to an approximate nearest neighbor (ANN) retrieval index, and determining an optimal matching result of an object in the search image to the query image based on an operation using the ANN retrieval index.

A system including a processor; and a computer-readable medium in communication with the processor and storing instructions that, when executed by the processor, cause the processor to perform applying a query image and a search image to a neural network of a feature extraction network of a computing device, the query image indicating an object to be searched for in the search image, wherein the feature extraction network includes the neural network, a spatial feature neural network coupled to receive a first output of the neural network pertaining to the search image, and an embedding network coupled to receive a second output of the neural network pertaining to the query image, generating spatial search features from the spatial feature neural network, generating a query feature from the embedding network, applying the query feature to an approximate nearest neighbor (ANN) retrieval index, and determining a best matching result of an object in the search image to the query image based on an operation using the ANN retrieval index.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
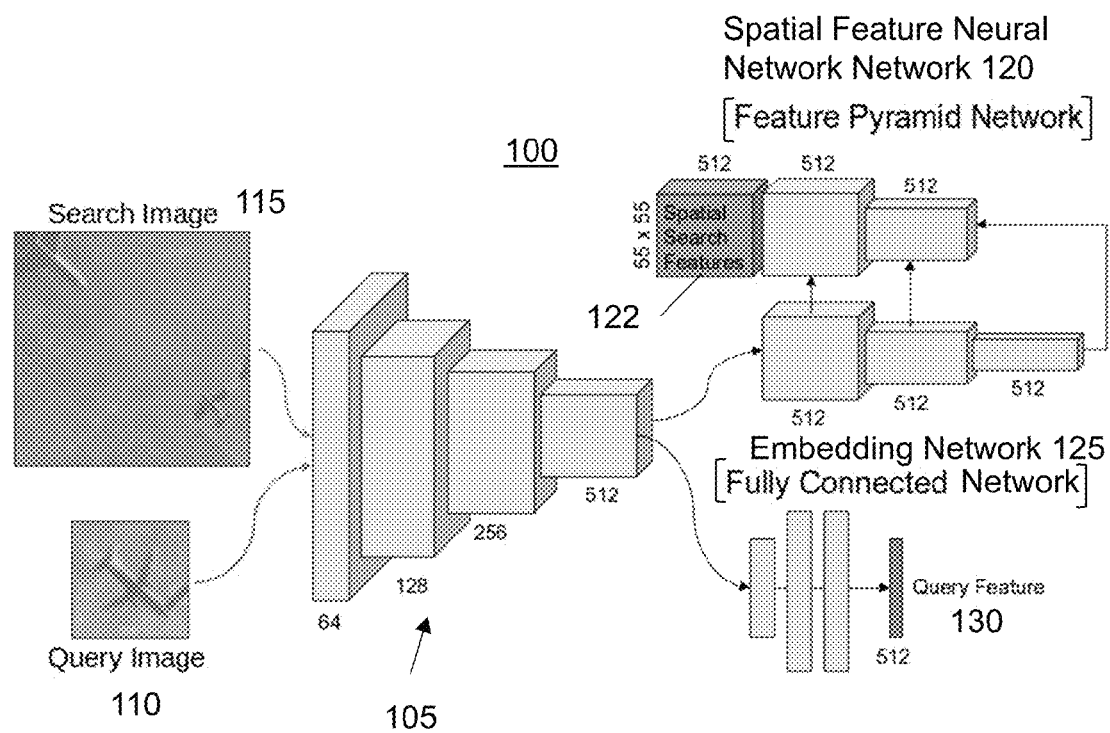
FIG. 1 illustrates a model architecture of a portion of a feature extraction network in accordance with aspects of the present disclosure.

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

In many CBIR applications it is not necessarily the case that queries and search results derive from the same underlying data. For example, in histopathological applications, the query may be a small section of the image that contains a certain structure or texture, whereas the search corpus is comprised of whole slide images. Likewise in satellite imagery one may be tasked with matching an object chip with semantically relevant patches of a large set of satellite imagery. This highlights the need for a CBIR approach that performs both similarity matching and spatial localization. Additionally, the present disclosure is not directed to matching a specific instance of an object, but instead to retrieving category level matches of similar objects in different visual contexts (environment, lighting, sensor modalities, etc.).

Deep learning techniques have proven particularly useful in this regard. By observing a large amount of annotated data they can distill out categorical feature representations that capture the desired notion of similarity. To demonstrate this approach, the present disclosure demonstrates the application of category level matching and localization of objects in the satellite image domain. There are two key challenges that this domain poses to deep learning approaches. The first challenge is the large imbalance in satellite imagery between areas of interest and background. A single image may represent hundreds of square kilometers, but a user of the system of the present disclosure is only interested in finding an object that subtends a few square meters. Any system that operates in this domain must have very robust ways of narrowing down the likely regions where an object of interest can be located. The second challenge in this domain is that the objects of interest themselves may be rare. It may not be possible to gather necessary training data to apply standard data-hungry deep learning techniques. This puts such applications in the low-shot scenario, where transfer learning and pre-training may have to be leveraged. In an extreme case, the source of truth could be a single image or sketch of the object.

Leaning into the rare object context, the present disclosure expands on previous work in the area of one-shot tracking, in particular, the use of fully convolutional neural networks and Siamese networks to build representations that can localize regions of an image that are a visual match with some user supplied query. With these approaches, the network produces spatial features representing the image and a spatial kernel for the object of interest. The spatial kernel is convolved with the image features to produce a heatmap of likely coordinates where the object can be found. The present disclosure introduces a deep learning model and training objective that is explicitly tuned for both semantic and visual similarity matching over large sets of features. This enables treating the problem of identifying objects of interest in large images as a CBIR problem. The spatial features extracted from images are treated as a search corpus and as little as a single example of the object can serve as the visual anchor for finding similar objects.

The problem of CBIR has been an active area of research for several decades. Our application of CBIR factors nicely into two complimentary topics. The first is the identification of features and metrics that accurately describe the intent of the retrieval and eliminate the semantic-gap, i.e., the difference between the low-level representations of images and their semantic counterparts. The second is the process of performing nearest neighbor search in a high dimensional space to produce a ranked list of the most relevant results.

The identification of features to be used for CBIR is largely application specific and requires concise specification of what criteria defines two images as similar (such as color, texture, content, etc.) Historically, hand crafted features, such as HSV histograms, SIFT features, Vector of Locally Aggregated Descriptors (VLAD), or "bag-of-words" have been used for CBIR. In recent years deep features from convolutional neural networks (CNNs) have been found to be useful for doing visual similarity search. Early work in this area used global representations based on the deep features from the CNNs, either based on fully connected or convolutional layers, directly for indexing and retrieval. Other approaches used feature aggregation and pooling techniques to produce compact feature vectors from convolutional layer activations to encode and produce features that represent the whole image or local image regions. It is also difficult to create deep features that generalize well from their training set to other domains. Data augmentation is a common approach to improve this generalization and some approaches explicitly try to learn discriminative representations that are more robust to these variations.

Later approaches in the area have drawn heavily from metric learning, which is an area of deep learning concerned with learning an embedding representation that captures notions of proximity with respect to the input. Specifically, in computer vision applications metric learning can be used to train models that understand notions of visual similarity by being shown examples and encoding this notion into the structure of the latent space. In a Siamese network with Triplet loss is used for image retrieval. In a coarse-to-fine deep metric learning technique based on the triplet loss is proposed for retrieval of remote sensing images. In a joint loss function, composed of a normalized softmax loss with margin and a high-rankness regularization term is proposed to exploit unlabeled datasets along with small number of labeled training examples for retrieval of remote sensing imagery. These approaches share many of the metric learning and similarity ranking ideas the present disclosure employs, but are still concerned with instance-level matching or whole image categorical matching, whereas the present disclosure is directed to categorical object localization within a larger image. Furthermore, the present system treats categorical localization and visual ranking as a joint task to produce features that are sensitive to both notions of similarity.

The process of performing approximate nearest neighbor (ANN) retrieval in high dimensional spaces has also seen a great deal of progress. High dimensional clustering, locality sensitive hashing, and vector quantization have all been successfully applied to reduce the computational hurdle of nearest neighbor search. In particular, deep hashing approaches have gained significant interest in the area of image retrieval. Deep hashing involves appending a hashing layer to deep features to learn binary hash codes that can be used to effectively and efficiently search the image database. The techniques differ based on the type of loss function used, (e.g., pair-wise similarity and triplet loss) and whether the codes are learned in an offline (batch) mode or in an online manner. These hashing approaches are only applicable to instance-level matching as they encode and search for image-level attributes to find similar images. For example, in a satellite image application, previous systems have employed online deep hashing techniques to match images that have similar land-cover, such as barren land, trees, grassland, etc. The present approach can use an open-source ANN library from the Facebook AI Research group. This is a particularly scalable and performant implementation for use with high dimensional deep features that exploits GPU parallelization to scale over large search sets.

Next methods and models used in building will be described for carrying out operations in a large-scale similarity search system. To start with, a deep learning architecture employed for the purpose of extracting features that encode the local visual features into a metric space that can be used for search will be described. Next, an outline will be provided of various training objectives and loss terms employed during training to implement this metric learning approach. Following that, details of the various training datasets, pipelines, and augmentations used to optimize the feature extractor will be described. Finally, a description will be provided as to how this deep learning model fits into a larger software system that indexes large amounts of imagery and uses the metric space properties of the feature extractor to enable visual search as a nearest neighbor retrieval task.

It is noted that although the description herein is primarily presented in terms of search for objects in satellite images, the system and method of this disclosure is not limited to only satellite images, and they could be used in any situation where it is desired to locate objects, including rare objects, which only occupy a small part of a large image. This includes, for example, searching for patterns in histopathological images, or other images in the medical field, where a large amount of data exists with minimal labels.

Visual Matching Feature Extractor Architecture and Training Objective

Referring to FIG. 1, a key aspect of the present system is a feature extractor 100 that is used to generate a compressed representation of each region of the uploaded imagery. This feature extractor 100 is designed with a backbone convolutional neural network 105 that distills information about increasingly large patches of the image into a high-dimensional feature representation. This backbone neural network 105 is inspired by the fully convolutional networks that have been successfully applied for segmentation and one-shot tracking applications. These models do not apply padding to the edges of the input image and intermediate layers. This ensures that the feature extractor output is strictly translation invariant, which is important for the visual search task. The output of this backbone neural network 105 is a spatial feature map of size D×(W/k)×(H/k), where D is the feature dimension, W and H are the width and height of the original image and k is a down-sampling factor which that depends on the architecture. We used D=512, k=8 in our experiments. A schematic of the feature extraction network 100 is shown in FIG. 1.

The backbone neural network 105 splits into two distinct branches that produce a different representation depending on the intended use of the input image. Image chips that depict a crop of the object of interest are referred to as query images 110 while larger image patches that will be searched to try to find objects corresponding to the query images 110 are referred to as search images 115. For use with search images 115, as shown in FIG. 1, the network implements a spatial feature branch as a spatial feature neural network 120, such as a feature pyramid network, on top of the spatial features extracted from the backbone neural network 105. It is noted that other neural network architectures could be used. This further down-samples the features and recombines them into a representation, s(x,y), that contains both low level visual features and high-level contextual features, such as the special search features 122 shown in FIG. 1. If the input image is to be used as a query image 110, the backbone features are flattened and fed through a query feature branch 125, which can be an embedding network such as the fully connected neural network shown in FIG. 1, which includes several fully connected deep layers to produce a single feature vector q of size 512 as a query feature 130. The decimation of the query image 130 into a non-spatial feature vector instead of a spatial kernel ensures that its information content is invariant to rotation in addition to translation. Each of the output features is L2 normalized along its channel dimension to produce unit-vector output.

In our implementation of the architectures, we use the following parameters. The images used for search feature extraction were W×H pixels in size (W=512, H=512 in our experiments), which produces a spatial feature map of size (512×55×55.) (i.e., the spatial search features 122) The query feature branch (e.g., the embedding network 125) is implemented to ingest images of size 128×128 pixels. The search image constraint may be relaxed by using tiled images for feature extraction and tracking the global position of each tile (and by extension, each feature vector.) For the query image 110, the image is resized to the proper dimensions before extracting the query feature 130.

Figure 2:
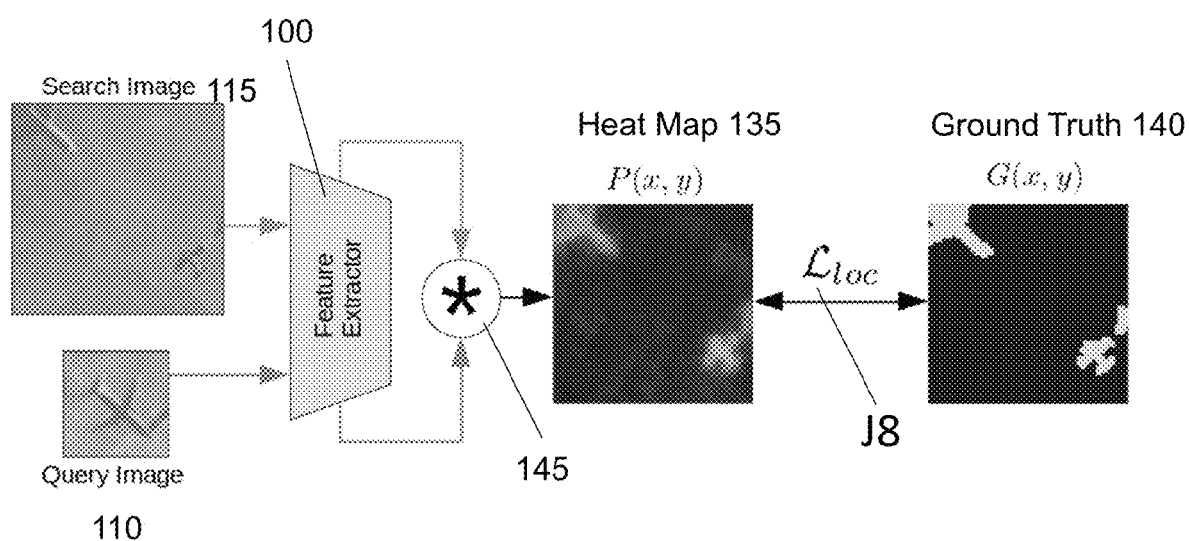
FIG. 2 illustrates generating a heat map using a cosine similarity operation for spatial search features extracted from a search image and a query feature extracted from a query image in accordance with aspects of the present disclosure.

Referring to FIGS. 1 and 2, the base feature extractor 100, spatial feature branch 120, and query feature branch (e.g., the embedding network 125) are all optimized jointly using a localization and a ranking loss. The localization loss is intended to produce a heat map 135 over the spatial features that indicates where in the search image 115 we might find something similar to the query object 110. This is performed by computing the cosine similarity between the 1D query feature and each of the W×H spatial features from the other branch. This produces the heat map 135, P(x,y), for this specific search/query pair defined by the following Equation 1:

$$P(x,y)=q^T \cdot s(x)$$

This heat map 135 is then subjected to a pixel-wise cross entropy loss (J8) with focal-loss modifications as shown FIG. 2 and in the following Equation 2:

$$\mathcal{L}_{loc}=-G(1-P)^2 \log(P)-(1-G)P^2 \log(1-P)$$

Areas of the image that are similar are expected to report values close to 1 and dissimilar areas are expected to report 0. The ground truth 140, G(x,y), is constructed by creating a binary segmentation of objects that share semantic class with the query chip. This kind of joint optimization puts constraints on the base feature extractor 100, spatial feature branch 120, and query feature branch 125. During training, the spatial feature branch 120 and query feature branch 125 must come to agreement on how to best represent visual similarity. A schematic of how this output is combined and compared to ground truth using a cosine similarity operation 145 is shown in FIG. 2.

In addition to the localization loss, which tries to determine where in a search image 115 one may find similar objects, the system also applies a ranking loss to the query features 130, (e.g., q). This is done by generating triplets from the data that contain a positive example, $q_p$, that is visually similar to the query and a negative example, $q_n$, that is semantically similar, but visually dissimilar. These triplets are used with a margin loss, Equation 3, shown below, to train the query feature branch 125 to produce more visually discriminating features.

$$\mathcal{L}_{rank}=[\|q_p-q\|-\|q_n-q\|+m]_+$$

This tries to constrain visually similar image patches to be closer together than visually dissimilar ones by some margin, m. In experiments it was found a value of m=0.03 is suitable for cosine similarity between unit-vectors. The use of these two loss objectives results in frustration during training and forces the network to produce a feature representation that is both general enough to report regions of an image that may contain semantically relevant objects as well as fine enough to rank these regions appropriately according to their visual similarity with the query chip.

Training Data and Augmentation Pipeline

As described above, the arrangement shown in FIG. 2 can be used for training the feature extractor of FIG. 1. Examples of such training will now be provided below with reference to FIGS. 3-6. Following training, using the arrangements shown in FIG. 2, FIGS. 7 and 8 will be discussed to show the use of the trained feature extractor of FIG. 1 for indexing and search operations.

The primary source of training data for the following disclosure was the DOTA (Department of Transportation, Airports Division) satellite image dataset. This contains oriented bounding box annotations for 18 common categories that include aircraft, vehicles, and boats, which were used as the basis for our localization training examples. To produce more realistic ground truth heat maps 135, use was made of iSAID (i.e., A Large-scale Dataset for Instance Segmentation in Aerial Images), which is an extension of DOTA to include semantic and instance segmentation masks. This exploits the semantic segmentation masks to produce ground truth heat maps that follow the contours of individual objects and provide a more robust training objective for the network.

Figure 3A:
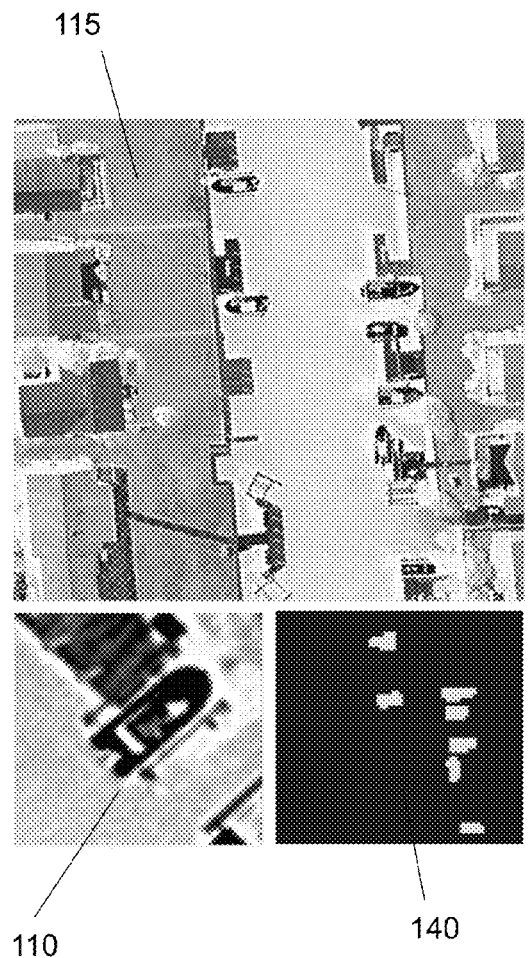
FIGS. 3A and 3B illustrate two closed-set training examples for training the feature extraction network in accordance with aspects of the present disclosure.
Figure 3B:
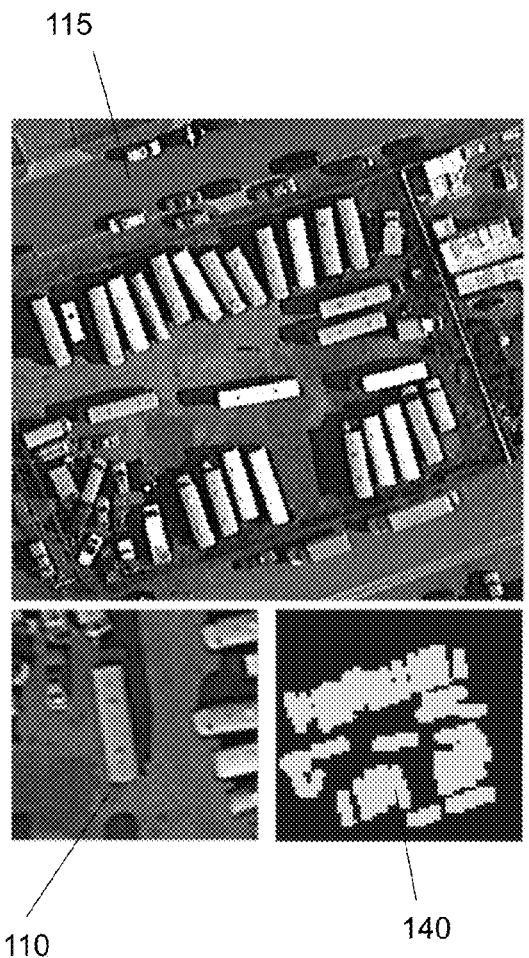
Figure 4A:
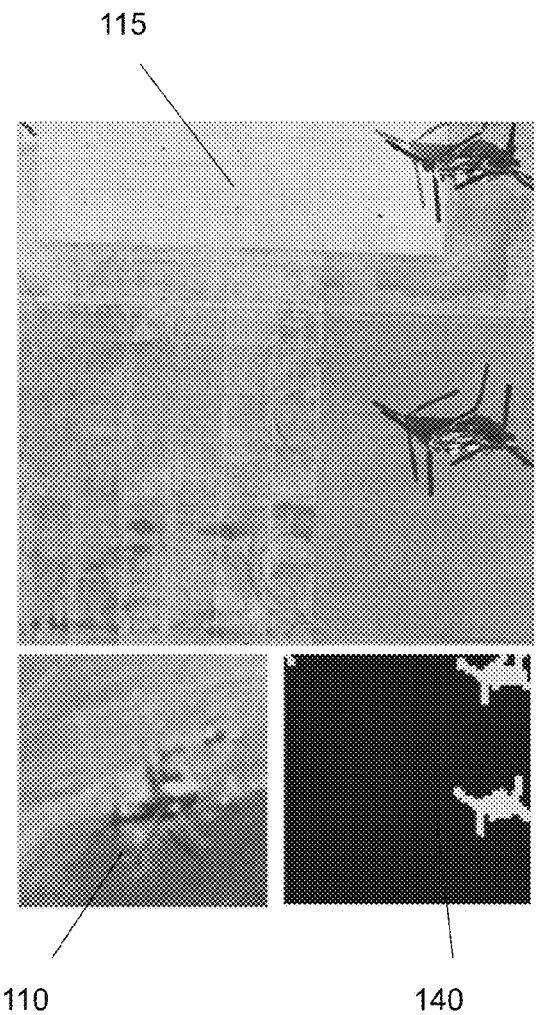
FIGS. 4A and 4B illustrate two open-set training examples for training the feature extraction network in accordance with aspects of the present disclosure.
Figure 4B:
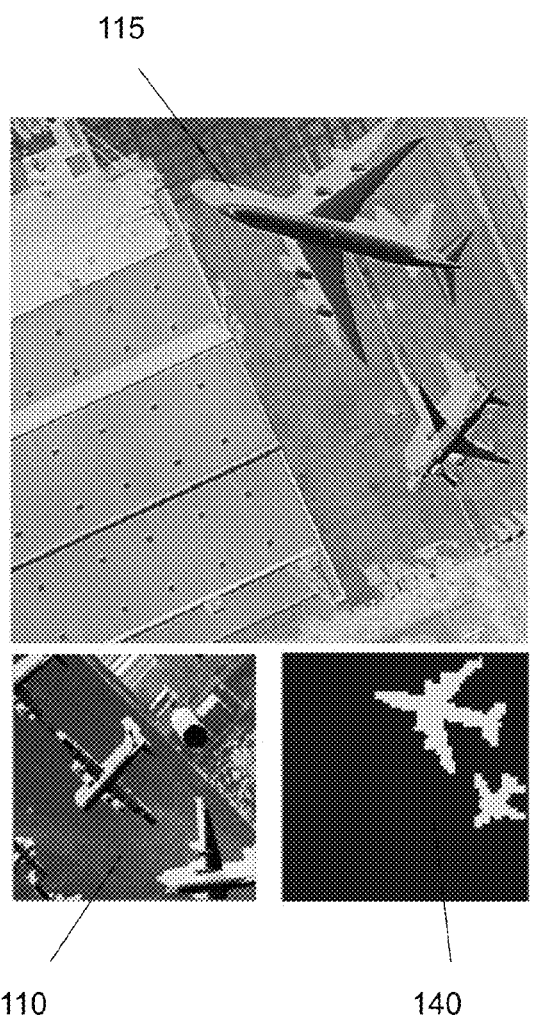
Figure 5A:
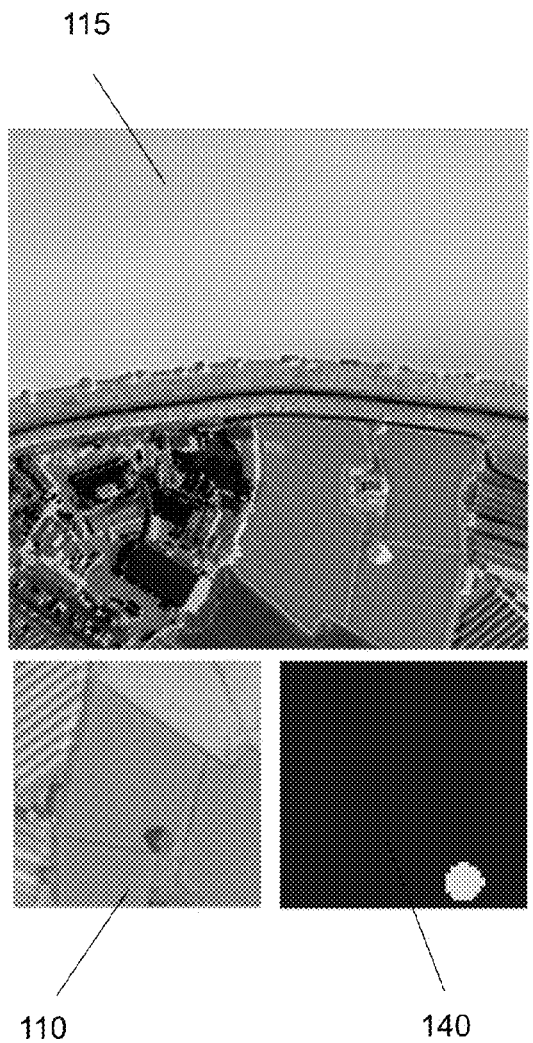
FIGS. 5A and 5B illustrate two random patch training examples for training the feature extraction network in accordance with aspects of the present disclosure.
Figure 5B:
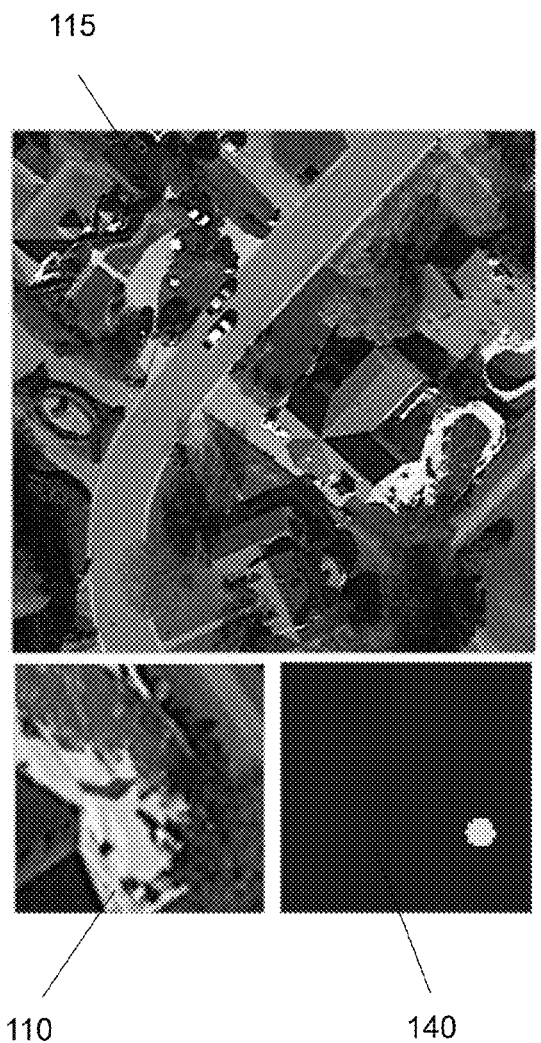

The localization training examples are mined from the iSAID data using the following pipeline. First a random image is chosen, then a random object is chosen from that image. The query image is constructed by performing a crop around the object with its extent derived from the bounding box annotations. This crop is resized to 128×128 pixels and is used as a query chip. Then another random object of the same class is chosen from the annotations. This second instance may be chosen from the same image as the query (a closed-set example, J2), or from another image in the dataset (an open-set example, J1) The ratio of closed-set to open-set examples is tunable in a pipeline, but a typical value is 1:4 closed-to-open ratio. A crop of size 512×512 pixels is then taken, which contains the target object-of-interest. The ground truth 140 is constructed by taking the semantic segmentation masks for that image and rasterizing the masks into a binary image. This binary mask is resized to 55×55 pixels to match the spatial feature resolution of the model. As an additional source of variability, random patch samples from the data are also mined, J3. These are closed-set search/query pairs where the target is a random patch of the parent image. The ground truth 140 is a circular region centered on the patch location with a diameter proportional to the patch's width. Random patch samples comprise 10% of the total training data. Two examples of all three training data modalities are shown in FIGS. 3-5. In each example the search image is 115 s, the query image is 110, and the ground truth is 140. Approximately 50% of examples used in training are negatives, in which the query object does not appear in the search image and the corresponding ground truth is empty. Further operations J4-J8 in the training pipeline are discussed below with regard to providing a train pipeline using the elements shown in FIGS. 1 and 2 to implement the examples shown in FIGS. 3-5.

Figure 6:
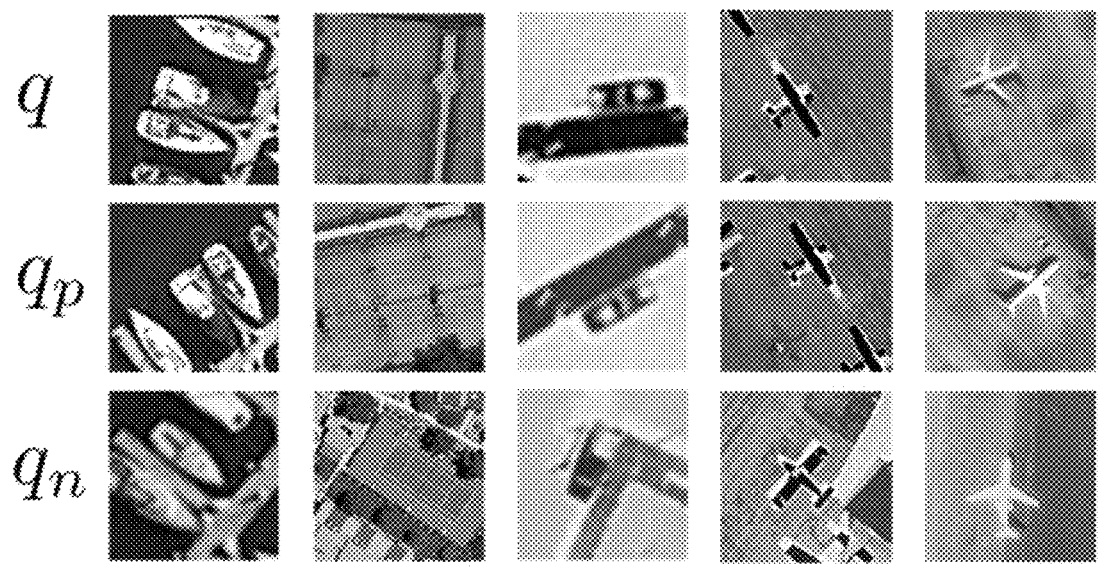
FIG. 6 illustrates the use of triplets for training examples for training the feature extraction network in accordance with aspects of the present disclosure.

The training pipeline also requires mining image triplets from the data for use with the ranking loss. This process involves choosing an anchor image, a positive (visually similar) example, and a negative (semantically similar but visually dissimilar) example. To produce triplets for the ranking loss, the query chip previously generated for the localization task is re-used as an anchor. The positive image chip is derived by re-cropping the exact same object with different parameters (scale, rotation, position, etc.). The positive chip is allowed to undergo its own brightness, contrast, and sharpness augmentations, but any additional color space augmentations are shared with the anchor. This produces a chip that contains a very similar looking object that is subtly different in ways one would expect to encounter if viewing distinct instances of the same object. In contrast, the negative chip is derived by finding a different example of the object class. This object is cropped and given its own independent set of augmentations. This produces an object chip that is semantically similar, but very different in its visual appearance to the anchor. Some examples of the triplets that are used during training are shown in FIG. 6.

To produce features that are more robust to the variations in color and modalities of satellite imagery, use is made of aggressive augmentations in our training pipeline, J4. In addition to flips, rotations, and brightness/contrast augmentations, hue-rotations, grey scale, and color inversion are also applied. This produces non-realistic imagery but confounds the use of specific colors or textures during feature learning. The intuition is that this will produce features that are more discriminative towards shapes and borders and can generalize to new color spaces and modalities.

Feature Indexing and Query Pathways

Figure 7:
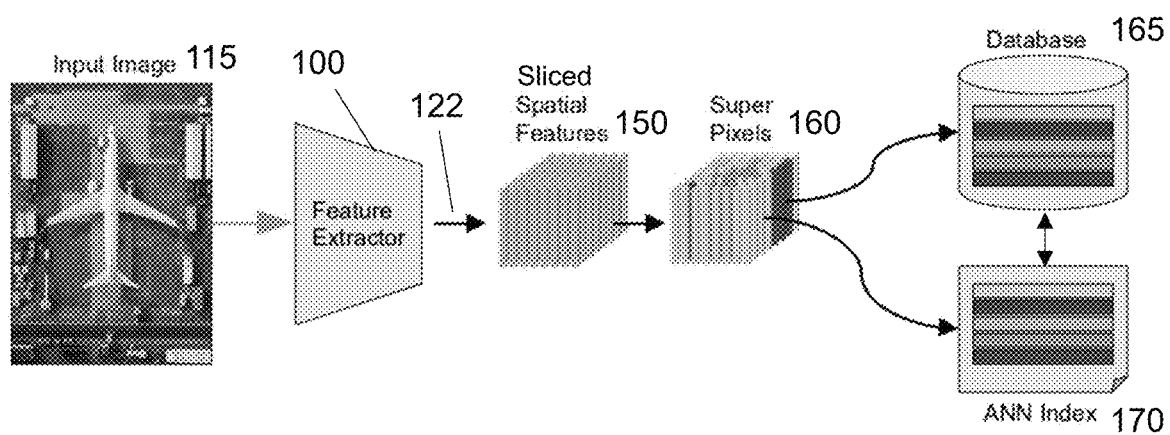
FIG. 7 illustrates an index pathway for indexing of spatial search features extracted in FIG. 1 in accordance with aspects of the present disclosure.
Figure 8:
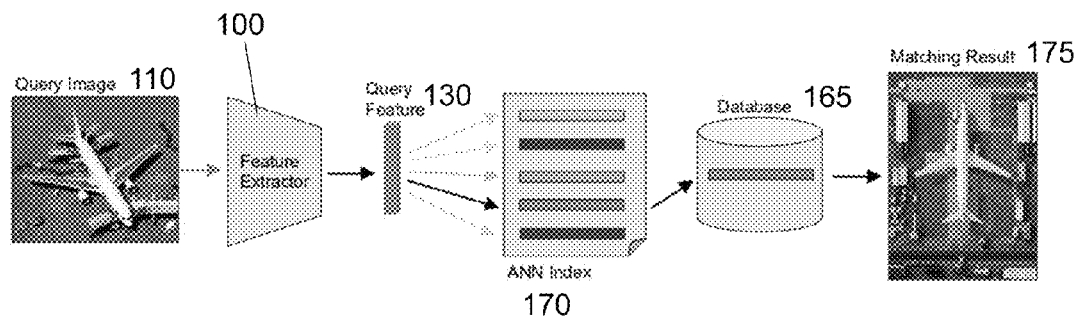
FIG. 8 illustrates a query pathway for generating a matching result corresponding to a query image, using an artificial neural network in accordance with aspects of the present disclosure.

The purpose of the trained feature extractor (using the arrangements discussed above with regard to FIG. 2 and the examples shown in FIGS. 3-6) is to compare an example query chip of an object to each of the spatial features in an image and produce a heat-map 135 of likely positions of similar objects. The following discussions with regard to FIGS. 7 and 8 show an implementation of such a trained feature extractor. Regarding this, it is noted that there is no reason that this process needs to be restricted to search over a single image at a time. One may instead pre-process a large amount of data into a catalog of features together with meta-data about the source image and spatial location of that feature. Continuing with this process one may produce a similarity score between the query and each feature in the catalog. This extends the problem of spatial localization in a single image to that of a nearest neighbor ranking problem in some metric space (in this case cosine distance over 512-dimensional unit-embeddings.) This is precisely the machinery that the present disclosure implements to perform large scale localization of rare objects.

Referring next to FIG. 7, indexing of spatial features is done by first slicing large satellite search images 115 output as the spatial search features 122 from the feature pyramid network 120 of the feature extractor 100 into 512×512 chunks, shown in FIG. 7 as sliced spatial features 150. This is done by striding a window across the search image 115 so that each position in the image is captured by at least one chunk. Each chunk is then processed by the spatial feature extractor 120 to produce a 55×55 set of sliced spatial features 150 for this chunk. These sliced spatial features 150 are then spatially pooled into super-pixel features 160 by grouping neighboring features if they exceed a specified similarity threshold. The effective super-pixel features 160 are defined as the normalized mean of its constituent features and its position is defined as the mean position of its constituents. These super-pixel features 160 are then stored into a database 165 along with metadata about their location. The super-pixel features are also used to build an approximate nearest neighbor (ANN) retrieval index 170. This process shown in FIG. 7 can be referred to as the index pathway.

More specifically, to perform a search for a matched result for a query image 110 over this set of super-pixel features 160 determined from a search image 115, the Facebook AI Similarity Search (FAISS) library can be used to build an ANN index 170 of all super-pixels. This allows performing an approximate nearest neighbor search in a high dimensional space with minimal latency using the super pixels to build the ANN index 170. By default, this ANN index 170 ranks results by Euclidean distance, but this can be converted to cosine distance to match with the scores observed during training. Finally, the query itself is performed by supplying a tight crop of the object-of-interest, i.e., the query image 110. This crop is transformed into a feature vector (e.g., the query feature 130) using the query feature branch 125 of the feature extractor 100. This query feature 130 is used as the anchor for the nearest neighbor ranking. Once a ranked list of features is returned by the ANN index 170, they are stored in the database 165, converted back into image space coordinates and returned to the user, along with the corresponding cosine matching score to provide a matching result 175. These operations shown in FIG. 8 can be referred to as the query pathway. For example, as shown in FIG. 8, one of the ranked images in the ANN retrieval index 170 can be matched with the query feature 130 determined by the query feature branch 125 of the feature extractor 100 and stored in the database 165 as the matched image 175.

Feature Based Localization Performance

To evaluate the performance of the localization model we must compare the heat map output, P(x,y), to the ground truth binary mask, G(x,y), produced with the segmentation data. To do so, we use an area-based definition of precision and recall. This definition treats the problem as a pixel-wise counting measure of true-positives, false-positives, and false-negatives. Given a heat map output from the model and a threshold, θ, we define the binarized output as, $P\_θ(x,y)=P(x,y)>θ$. This can be used to define precision and recall as pixel-wise products and sums, as shown in the following Equations 4 and 5:

$$p(\theta) = \frac{\sum_{x,y} P_\theta(x, y) \cdot G(x, y)}{\sum_{x,y} P_\theta(x, y)}$$

$$r(\theta) = \frac{\sum_{x,y} P_\theta(x, y) \cdot G(x, y)}{\sum_{x,y} G(x, y)}$$

Figures 9A, 9B:
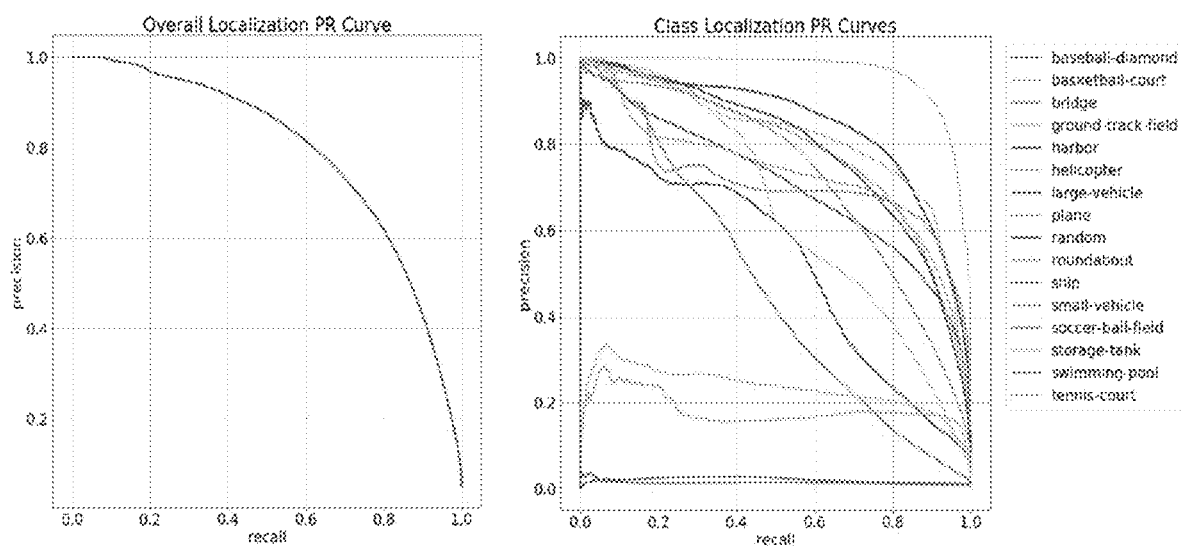
FIGS. 9A and 9B are graphs illustrating localization performance of the feature extraction network in accordance with aspects of the present disclosure.

Together, these provide a good measure of the tradeoff between precision and recall as the similarity threshold is varied. This quantity was measured for each DOTA class to track how well the model is able to localize regions of interest. The evaluation data is produced via the same data pipeline, as previously described, but drawn from the DOTA validation images. The area-based precision and recall for this model is shown in FIGS. 9A and 9B. These curves show a range of performance depending on the class-under-test. The classes which do not have high shape variance, such as tennis court, show very robust localization and whereas classes which do not have well-defined features, such as swimming pool, do not perform as well. In general this performance measure favors larger objects with more pixels, but comparable performance is seen for most classes, including small vehicle, which is the smallest (and most abundant) class in this dataset. The random patch performance is near chance, but the random patch samples ensure that the query branch is exposed to images that do not contain objects during training. The overall localization shows good performance characteristics over the range of thresholds and achieves a 0.82 AUC (i.e., Area Under the Curve).

Figure 10:
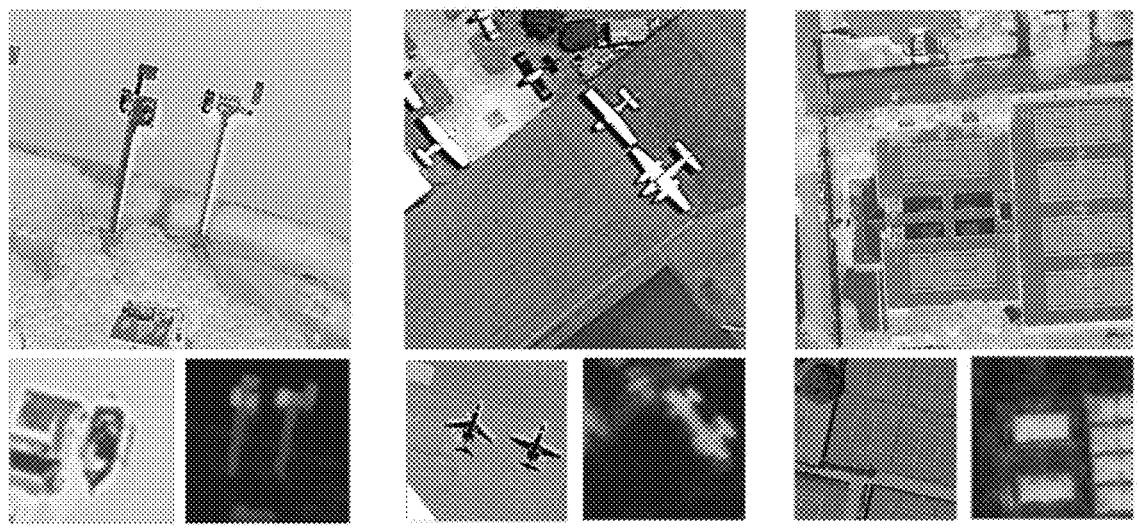
FIG. 10 illustrates inference examples using the feature extraction network of FIG. 1 in accordance with aspects of the present disclosure.

It is also useful to look at the heatmaps 136, P(x,y), produced by the model directly to qualitatively assess whether the localization task is producing what we would expect from the given query and search image. Some examples of this output for various classes are shown in FIG. 10. The figure shows that the localization objective is being adhered to and is producing interpretable localization signals.

Image Based Search and Ranking

Figure 11:
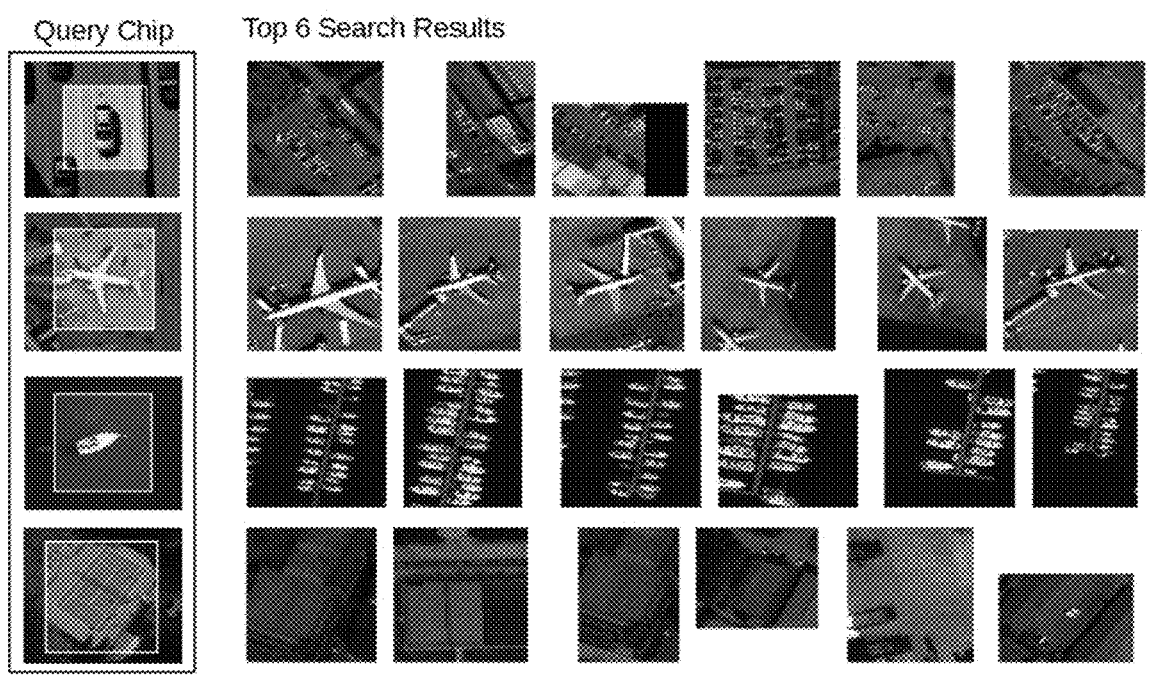
FIG. 11 illustrates inference examples using the feature extraction network of FIG. 1 in accordance with aspects of the present disclosure.

With the trained feature extractor, one can index and perform search over large amounts of satellite imagery. To measure the performance of our combined model and search infrastructure we use a subset of the xView dataset as our source of search features and object queries. This dataset contains over 1 million annotated objects from 60 fine-grained classes. Twenty (20) full size satellite images were used for a target search domain. This set provides coverage of many classes that semantically overlap with DOTA as well as a few examples of rare objects with distinct visual appearance. When ingested, this set of images produces approximately 20,000 super-pixel features that represent the search space. Some qualitative results of the search results over this setup are shown in FIG. 11.

To quantitatively measure the performance of the system's combined feature extractor and search system we use the ground truth bounding box annotations to assign a relevance score to each result from a given query. This is computed by taking the centroid location of the search result and comparing it to the bounding boxes of that image. If the centroid falls within a bounding box and the box has a class label that matches the original query, then the search result is assigned a relevance of 1, otherwise its relevance is 0. For each query this produces a relevance vector, R(i), that indicates whether the $i^{th}$ search result was relevant to the query.

The relevance vector is used to compute several different scalar metrics that allows summarizing the efficacy of the model and search performance. One such metric is the normalized discounted cumulative gain (NCDG,) which measures the correctness of the ranking with respect to the ideal ordering. The precision-at-k for the search results is also measured, which indicates what fraction of the top k results can be expected to contain a relevant object. Considering the top N search results these quantities are defined in the following equations 6 and 7:

$$NDCG = \sum_{i=1}^{N} \frac{R(i)}{\log(i+1)} / \sum_{i=1}^{\|R\|_1} \frac{1}{\log(i+1)}$$

$$p(k) = \frac{\sum_{i=1}^{k} R(i)}{k}$$

These quantities are measured by performing 20 searches for each class and logging the relevance of the top 100 search results. The query images are chosen by selecting a random instance of the class from the xView dataset and cropping its bounding box.

Figure 12A:
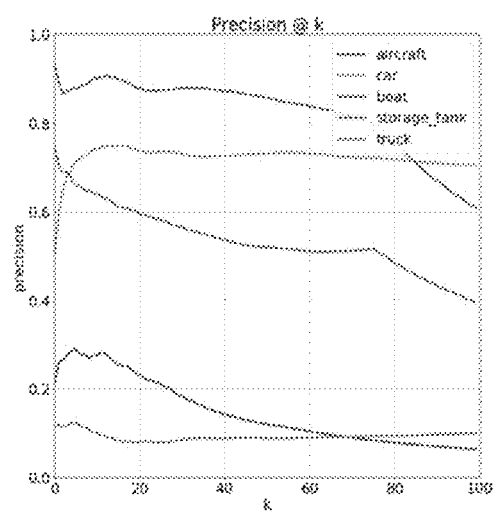
FIGS. 12A and 12B are graphs illustrating search precision and a search confusion matrix, respectively, in accordance with aspects of the present disclosure.
Figure 12B:
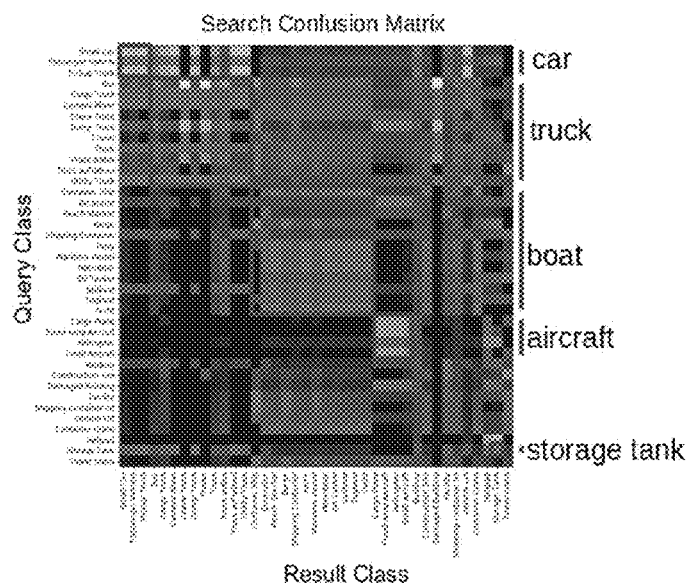

Due to the large number of fine-grained classes in xView we measure the NDCG and precision-at-k for coarse classes that represent a grouping of fine-grained classes. The full fine-grained confusion matrix for xView is shown in FIG. 12B and displays how classes are grouped together into coarse grained classes. The NDCG of the coarse classes is shown in Table 1 below, and shows that the top 100 results for "aircraft," "car," and "boat" are well ranked, with the most relevant results appearing at the top of the list. The precision-at-k and confusion matrix for this search task are shown in FIGS. 12A and 12B, respectively, and mirror the NDCG results, with a high fraction of the top results for "aircraft," "car," and "boat" returning relevant results. The confusion matrix shows a block structure that matches the definition of our coarse classes, indicating that the results tend to be of semantic relevance to the query.

TABLE 1

NDCG Results

| Class | NDCG |
|---|---|
| Aircraft | 0.9569 |
| Car | 0.9204 |
| Boat | 0.9183 |
| Storage Tank | 0.7624 |
| Truck | 0.5408 |

One-Shot and Zero-Shot Object Localization Performance

Figure 13:
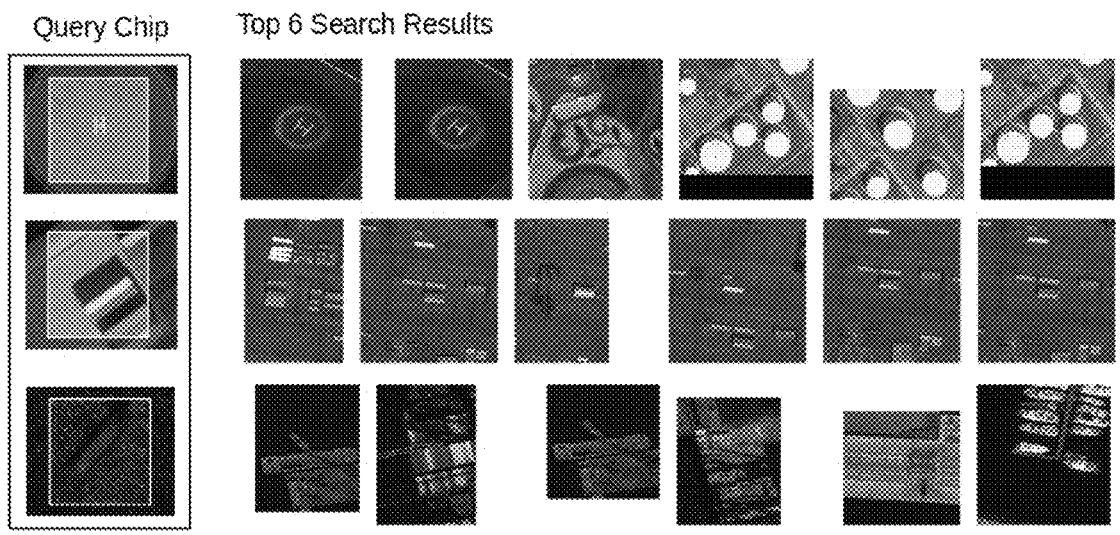
FIG. 13 illustrates one-shot results utilizing the feature extraction network of FIG. 1 in accordance with aspects of the present disclosure.

To test the system's one-shot localization capabilities, a search task was performed on classes that exist in the evaluation set ontology (xView) but not in the training set ontology (DOTA.) This provides a measure of how well the feature extractor can localize novel objects that were not encountered during training. Examples of the search results for one-shot classes, "helipad," "shipping container," and "barge" are shown in FIG. 13.

Figure 14:
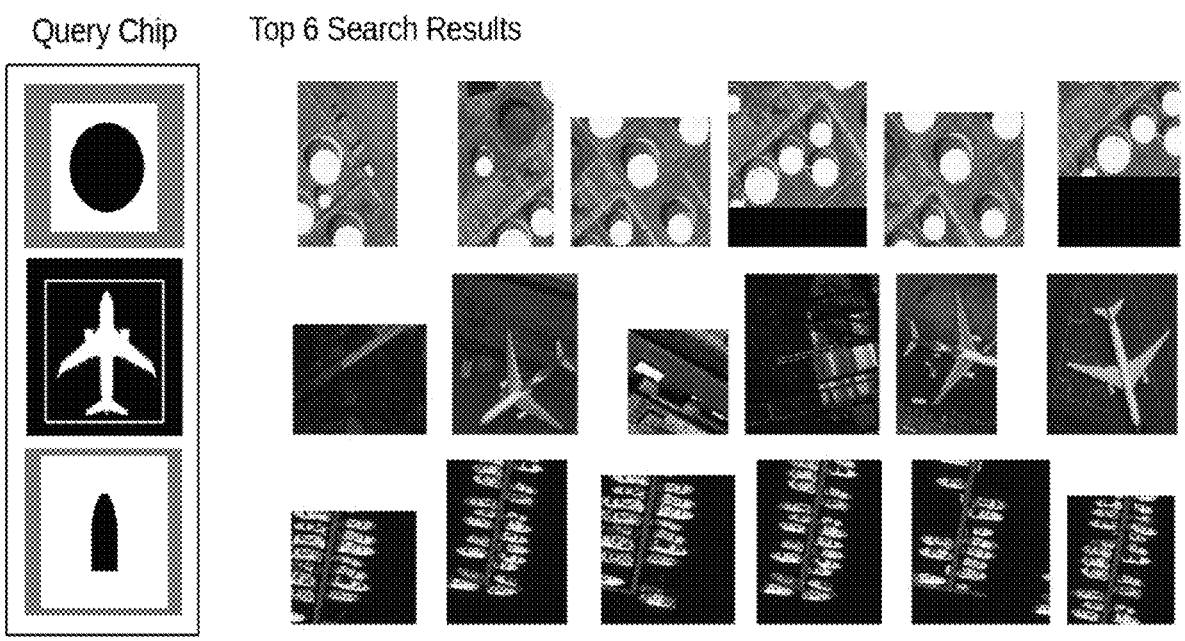
FIG. 14 illustrates zero-shot results utilizing the feature extraction network of FIG. 1 in accordance with aspects of the present disclosure.

Even without having trained explicitly for these classes, the system is still able to localize examples of them from within the larger set of imagery using visual similarity. To test the limits of the model's ability to localize objects by visual similarity, experiments were also performed in which a sketch-like query was used. The model was never trained with this kind of data, so this represents a zero-shot localization task. FIG. 14 shows results of the system on three sketch-like queries, binary images of a simple circle, a cruciform airplane silhouette, and a small motorboat silhouette.

The above disclosure has introduced a CBIR system and method that enables rare object search within large volumes of satellite imagery. This system and method use a deep convolutional feature extractor that is trained using a novel joint localization and ranking task with radical color space augmentations. This produces image features that encode both semantic and visual descriptors for the object of interest. Additionally, the features are trained to rely on shape and texture over direct color space correlations, facilitating domain transfer to new datasets and modalities. The system and method also uses the trained feature extractor to ingest and index large amounts of imagery, which can be queried using an image chip of an object of interest. The system and method achieve good search relevance over classes that had semantic overlap between different datasets as well as recover relevant results for novel classes in the one-shot and zero-shot settings.

Figure 15:
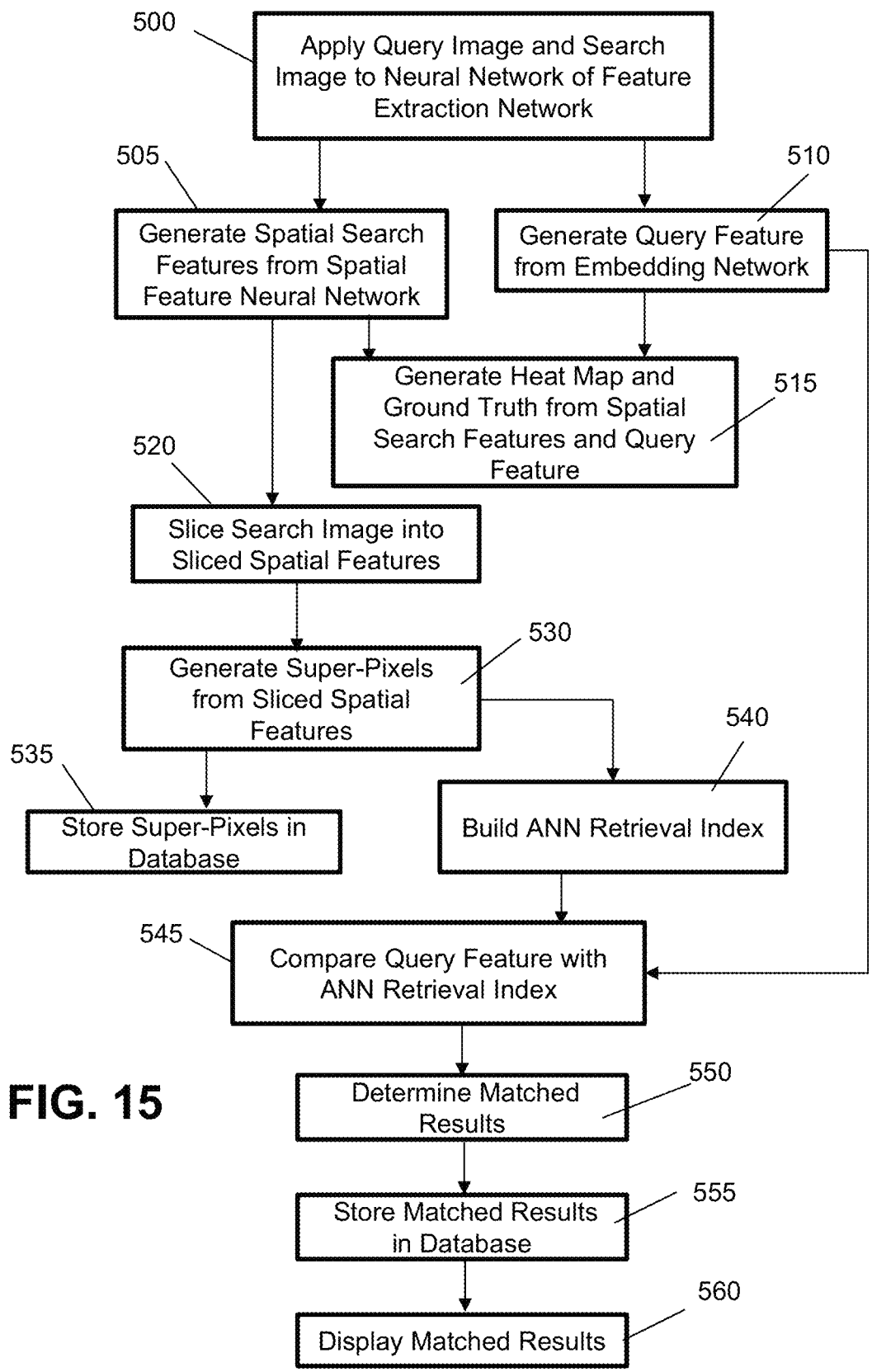
FIG. 15 illustrates a flowchart of exemplary operations for locating query objects in large search images in accordance with aspects of the present disclosure.

FIG. 15 illustrates a flowchart of exemplary operations for locating query objects 110 in large search images 115 in accordance with aspects of the present disclosure. In particular, FIG. 15 shows a flowchart of the operations of the elements shown in FIGS. 1, 2, 7 and 8 to locate and display matched results 175 for query images 110 within display images 115, such as satellite images with a vast amount of data.

Starting with step 500, the query image 110 and the search image 115 are applied to the neural network 105 of the feature extraction network 100 shown in FIG. 1. In step 505 the spatial search features 122 are generated from the spatial feature neural network 120. In step 510, the query feature of 530 is generated from the embedding network 125. As shown in FIG. 2, a heat map 135 and a ground truth 140 is generated in step 515 from the spatial search features 122 and the query feature 130. As discussed above, step 515 can be implemented with the arrangement shown in FIG. 2 for purposed of training the feature extractor of FIG. 1 so that it can then be used for successful indexing and searching using the arrangements shown, for example, in the implementation discussed above regarding FIGS. 7 and 8. The indexing and searching operations, once the feature extractor has been trained, will be discussed below with regard to steps 520-560.

In step 520, the search image 115 used to produce the spatial search features 122 is indexed by slicing the search image 115 into sliced spatial features 150 corresponding to the spatial search features 122, as shown in FIG. 7. In step 530, super pixels 160 are generated from the sliced spatial features 150. In step 535, these super pixels 160 are stored in a database 165. Also, the ANN retrieval index 170 is built from the super pixels 160 in step 540.

Next, in step 545, the query feature 130 is compared with the super pixels 160 in the ANN retrieval index 170 to determine matched results 175 (step 550) for the query feature 130 amongst all of the super pixels 160 in the ANN retrieval index 170. In step 555, the matched results 175 are stored in the database 165 and, in step 560, these matched results 175 are displayed. In other words, the matched results 175 represent the best matches for the query image 110 found within the search image 115. It is noted that in addition to performing the steps 500, 505 and 510 in the feature extractor 100, the operations shown for steps 515, 520, 530, 535, 540, 545, 550, 555 and 560 can also all be performed by processing elements within the feature extractor 100 itself, if desired, or can be performed by separate computer operational elements connected to the output of the feature extractor 100.

Figure 16:
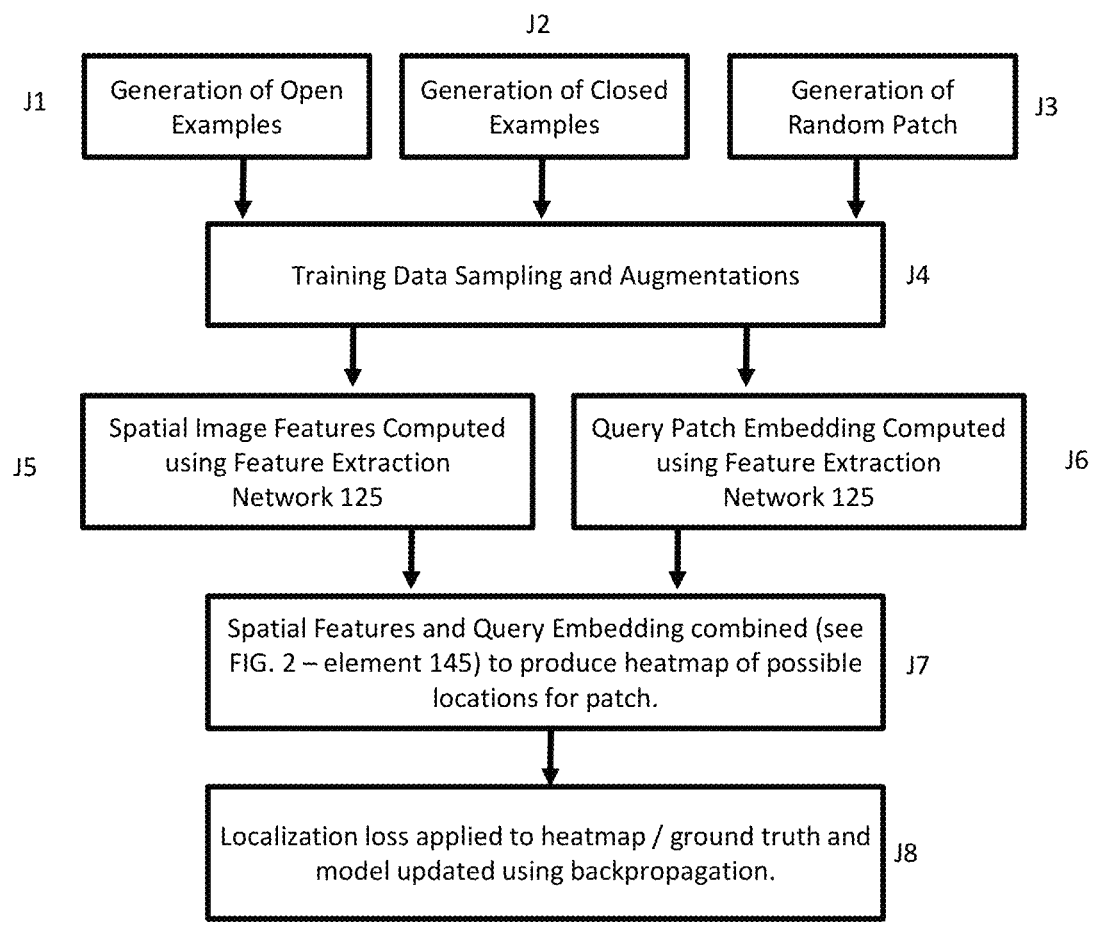
FIG. 16 is a flowchart of the feature extractor training pipeline including three data generators (J1-J3) and logic for localization training (J4-J7) for carrying out training shown in FIGS. 3-6 using the elements shown in FIGS. 1 and 2.

FIG. 16 is a flowchart of the feature extractor training pipeline including three data generators (J1-J3) and logic for localization training (J4-J7) for carrying out training shown in FIGS. 3-6 using the elements shown in FIGS. 1 and 2. Specifically, FIG. 16 shows operations J1-J7 that can be used for training for producing accurate heat maps 135 to match the ground truths 140, as shown in the examples of FIGS. 3-6, using the elements shown in FIGS. 1 and 2.

To begin with, as discussed above under the heading "Training Data and Augmentation Pipeline" with reference to FIGS. 3-6, operations J1-J3 are carried out to generate open examples (J1), closed examples (J2) and random patches (J3). In operation J4, the data from the data generating operations J1-J3 are sampled and augmented, if desired, for training purposes. Once the training data samples have been determined in operation J4, in operation J5 spatial image features 122 are computed using the feature extraction network 120, as discussed above with regard to FIG. 1. In a parallel operation J6, a query feature 130 (or query patch embedding) is computed from a query image 110 using the feature extraction network 125, as discussed above with regard to FIG. 1.

The training pipeline continues in operation J7 by combining the spatial features 122 and the query patch embedding 130 using the element 145 shown in FIG. 2 to produce heatmaps 135 of possible locations for the patch 110 within the search image 115. Finally, a localization loss operation (J8) is performed on the generated heatmap 135 and the groundtruth 140 to update the parameters of the feature extractor 100 using backpropagation.

Figure 17:
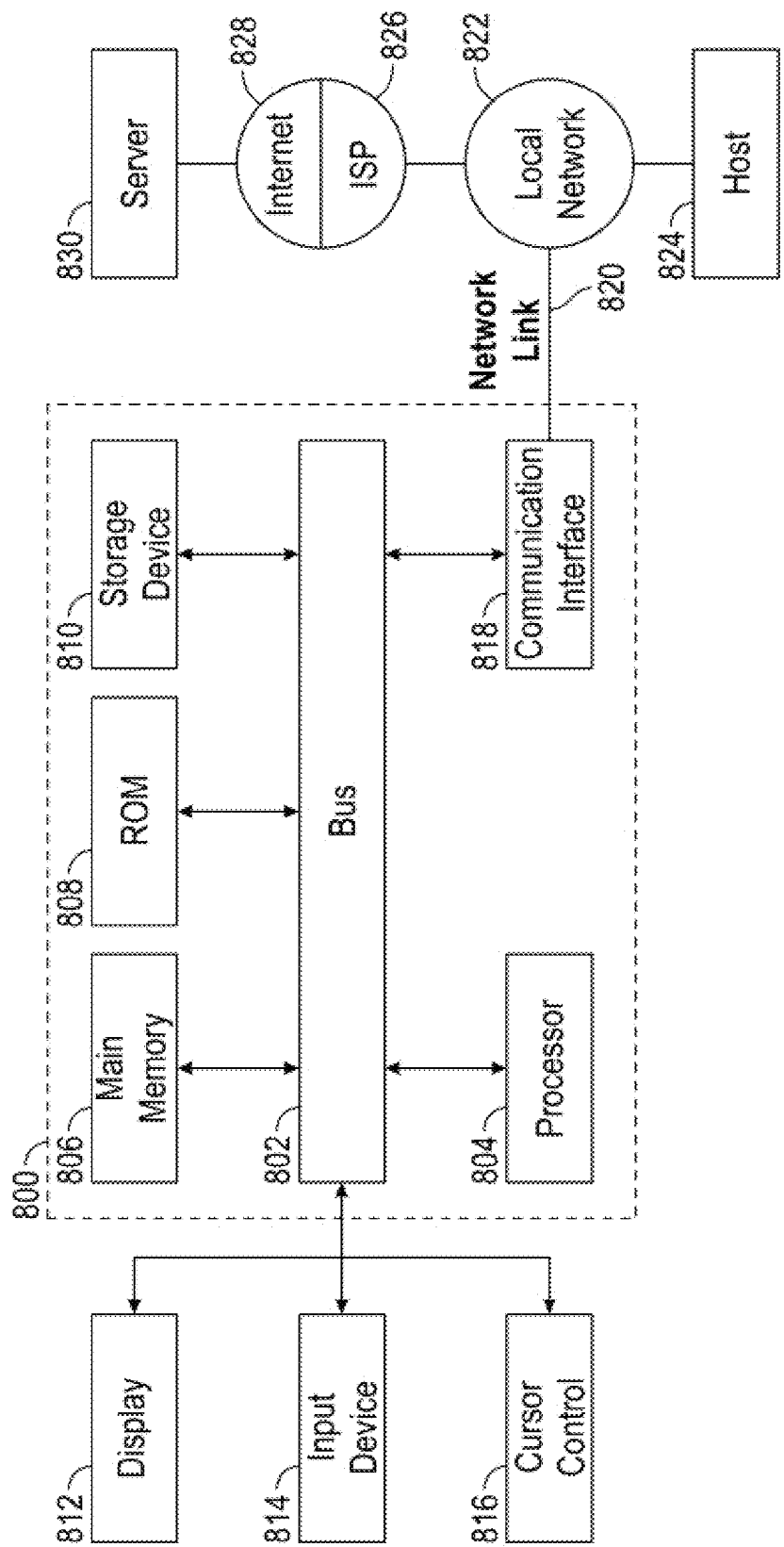
FIG. 17 is a block diagram showing an example computer system upon which aspects of this disclosure may be implemented.

FIG. 17 is a block diagram showing an example a computer system 800 upon which aspects of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. The computer system 800 may implement, for example, the user device 110, the server 120 and the shared hot desk device 130.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, which are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program.

In the following, further features, characteristics and advantages of the invention will be described by means of items:

Item 1. A computer-implemented method includes applying a query image and a search image to a neural network of a feature extraction network of a computing device, the query image indicating an object to be searched for in the search image. The feature extraction network includes the neural network, a spatial feature neural network receiving a first output of the neural network pertaining to the search image, and an embedding network receiving a second output of the neural network pertaining to the query image. The method includes generating spatial search features from the spatial feature neural network, generating a query feature from the embedding network, applying the query feature to an artificial neural network (ANN) index, and determining an optimal matching result of an object in the search image based on an operation using the ANN index.

Item 2. The method of item 1, further comprising indexing the spatial search features from the spatial feature neural network by converting the search image into sets of spatial features, spatially pooling the sets of spatial features into super-pixels by grouping neighboring features if they exceed a specified similarity threshold, and storing the super-pixels in a database.

Item 3. The method of item 1 or 2, further comprising determining cosine similarity between the query feature and the spatial search features to produce a ranked list of likely positions of objects in the search image which are similar to the query image.

Item 4. The method of any of claims 1-3, further comprising determining cosine similarity between the query feature and the spatial search features to produce a ranked list of likely positions of objects in the search image which are similar to the query image.

Item 5. The method of any of items 1-4, further comprising optimizing feature extractor parameters by performing a cosine similarity operation to minimize localization loss and to generate a heatmap similar to the ground truth (J8).

Item 6. The method of any of items 1-5, further comprising applying a ranking loss to a plurality of query features generated by the embedding network to produce improved visually discriminating features.

Item 7. The method of any of items 1-6, further comprising optimizing an end-to-end neural network including the feature extraction network, the spatial feature extraction network and the embedding network by using at least one of training datasets, pipelines and augmentations to train the end-to-end neural network.

Item 8. The method of any of items 1-7, wherein the optimizing includes training using at least one of open examples, closed examples and random patches.

Item 9. The method of any of items 1-8, further comprising a training process including mining negative and positive examples from both unlabeled and labeled data to optimize the localization loss and the ranking loss.

Item 10. The method of any of items 1-9, wherein the spatial feature neural network comprises a feature pyramid network.

Item 11. The method of any of items 1-10, wherein the embedding network comprises a fully connected network.

Item 12. A system including a processor and a computer-readable medium in communication with the processor and storing instructions that, when executed by the processor, cause the processor to perform applying a query image and a search image to a neural network of a feature extraction network of a computing device, the query image indicating an object to be searched for in the search image, wherein the feature extraction network includes the neural network, a spatial feature neural network coupled to receive a first output of the neural network pertaining to the search image, and an embedding network coupled to receive a second output of the neural network pertaining to the query image, generating spatial search features from the spatial feature neural network, generating a query feature from the embedding network, applying the query feature to an approximate nearest neighbor (ANN) retrieval index, and determining a best matching result of an object in the search image to the query image based on an operation using the ANN retrieval index.

Item 13. The system of item 12, wherein the instructions, when executed by the processor, cause the processor to further perform indexing the spatial search features from the spatial feature neural network by slicing the search image into sets of spatial features, spatially pooling the sets of spatial features into super-pixels by grouping neighboring features if they exceed a specified similarity threshold, and storing the super-pixels in a database.

Item 14. The system of item 12 or 13, wherein the instructions, when executed by the processor, cause the processor to further perform building the ANN retrieval index using the super-pixels.

Item 15. The system of any of items 12-14, wherein the instructions, when executed by the processor, cause the processor to further perform determining cosine similarity between the query feature and the spatial search features to produce a ranked list of likely positions of objects in the search image which are similar to the query image.

Item 16. The system of any of items 12-15, wherein the instructions, when executed by the processor, cause the processor to further perform optimizing the heat map by performing a cosine similarity operation to minimize localization loss.

Item 17. The system of any of items 12-16, wherein the instructions, when executed by the processor, cause the processor to further perform applying a ranking loss to a plurality of query features generated by the embedding network to produce improved visually discriminating features.

Item 18. The system of any of items 12-17, wherein the instructions, when executed by the processor, cause the processor to further perform optimizing an end-to-end neural network including the feature extraction network, the spatial feature extraction network and the embedding network by using at least one of training datasets, pipelines and augmentations to train the end-to-end neural network.

Item 19. The system of any of items 12-18, wherein the instructions, when executed by the processor, cause the processor to further perform a training process including mining negative and positive examples from both unlabeled and labeled data to optimize the localization loss and the ranking loss.

Item 20. The system of any of items 12-19, wherein the spatial feature neural network comprises a feature pyramid network.

Item 21. The system of any of items 12-20, wherein the embedding network comprises a fully connected network.

It is noted that although the above description has primarily been presented in terms of search for objects in satellite images, the system and method of this disclosure is not limited to only satellite images, and they could be used in any situation where it is desired to locate objects, including rare objects, which only occupy a small part of a large image. This includes, for example, searching for objects in histopathological images, or other images in the medical field, where a large amount of data exists in the images.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A computer-implemented method comprising:
applying a query image and a search image to a neural network of a feature extraction network of a computing device, the query image indicating an object to be searched for in the search image, wherein the feature extraction network includes the neural network, a spatial feature neural network coupled to receive a first output of the neural network pertaining to the search image, and an embedding network coupled to receive a second output of the neural network pertaining to the query image;
generating spatial search features from the spatial feature neural network;
indexing the spatial search features from the spatial feature neural network by slicing the search image into sets of spatial features, spatially pooling the sets of spatial features into super-pixels by grouping neighboring features if they exceed a specified similarity threshold, and storing the super-pixels in a database;
generating a query feature from the embedding network;
applying the query feature to an approximate nearest neighbor (ANN) retrieval index; and
building the ANN retrieval index using the super-pixels;
determining cosine similarity between the query feature and the spatial search features to produce a heat map of likely positions of objects in the search image which are similar to the query image; and
determining an optimal matching result of an object in the search image to the query image based on an operation using the ANN retrieval index.

2. The method of claim 1, further comprising optimizing feature extractor parameters by performing a cosine similarity operation to minimize localization loss and to generate a heatmap similar to the groundtruth.

3. The method of claim 2, further comprising applying a ranking loss to a plurality of query features generated by the embedding network to produce improved visually discriminating features.

4. The method of claim 3, further comprising optimizing an end-to-end neural network including the feature extraction network, the spatial feature extraction network and the embedding network by using at least one of training datasets, pipelines and augmentations to train the end-to-end neural network.

5. The method of claim 4, wherein the optimizing includes training using at least one of open examples, closed examples and random patches.

6. The method of claim 3, further comprising a training process including mining negative and positive examples from both unlabeled and labeled data to optimize the localization loss and the ranking loss.

7. The method of claim 1, wherein the spatial feature neural network comprises a feature pyramid network.

8. The method of claim 7, wherein the embedding network comprises a fully connected network.

9. A system comprising:
a processor; and
a computer-readable medium in communication with the processor and storing instructions that, when executed by the processor, cause the processor to perform:
applying a query image and a search image to a neural network of a feature extraction network of a computing device, the query image indicating an object to be searched for in the search image, wherein the feature extraction network includes the neural network, a spatial feature neural network coupled to receive a first output of the neural network pertaining to the search image, and an embedding network coupled to receive a second output of the neural network pertaining to the query image;
generating spatial search features from the spatial feature neural network;
indexing the spatial search features from the spatial feature neural network by slicing the search image into sets of spatial features, spatially pooling the sets of spatial features into super-pixels by grouping neighboring features if they exceed a specified similarity threshold, and storing the super-pixels in a database;
generating a query feature from the embedding network;
applying the query feature to an approximate nearest neighbor (ANN) retrieval index;
building the ANN retrieval index using the super-pixels;
determining cosine similarity between the query feature and the spatial search features to produce a heat map of likely positions of objects in the search image which are similar to the query image; and
determining a best matching result of an object in the search image to the query image based on an operation using the ANN retrieval index.

10. The system of claim 9, wherein the instructions, when executed by the processor, cause the processor to further perform optimizing the heat map by performing a cosine similarity operation to minimize localization loss.

11. The system of claim 10, wherein the instructions, when executed by the processor, cause the processor to further perform applying a ranking loss to a plurality of query features generated by the embedding network to produce improved visually discriminating features.

12. The system of claim 11, wherein the instructions, when executed by the processor, cause the processor to further perform optimizing an end-to-end neural network including the feature extraction network, the spatial feature extraction network and the embedding network by using at least one of training datasets, pipelines and augmentations to train the end-to-end neural network.

13. The system of claim 11, wherein the instructions, when executed by the processor, cause the processor to further perform a training process including mining negative and positive examples from both unlabeled and labeled data to optimize the localization loss and the ranking loss.

14. The system of claim 9, wherein the spatial feature neural network comprises a feature pyramid network.

15. The system of claim 14, wherein the embedding network comprises a fully connected network.

16. A non-transitory computer-readable medium storing instructions for performing a method, the method comprising:
  applying a query image and a search image to a neural network of a feature extraction network of a computing device, the query image indicating an object to be searched for in the search image, wherein the feature extraction network includes the neural network, a spatial feature neural network coupled to receive a first output of the neural network pertaining to the search image, and an embedding network coupled to receive a second output of the neural network pertaining to the query image;
  generating spatial search features from the spatial feature neural network;
  indexing the spatial search features from the spatial feature neural network by slicing the search image into sets of spatial features, spatially pooling the sets of spatial features into super-pixels by grouping neighboring features if they exceed a specified similarity threshold, and storing the super-pixels in a database;
  generating a query feature from the embedding network;
  applying the query feature to an approximate nearest neighbor (ANN) retrieval index;
  building the ANN retrieval index using the super-pixels;
  determining cosine similarity between the query feature and the spatial search features to produce a heat map of likely positions of objects in the search image which are similar to the query image; and
  determining an optimal matching result of an object in the search image to the query image based on an operation using the ANN retrieval index.

17. The non-transitory computer-readable medium of claim 16, wherein the method further comprises optimizing feature extractor parameters by performing a cosine similarity operation to minimize localization loss and to generate a heatmap similar to the groundtruth.

18. The non-transitory computer-readable medium of claim 17, wherein the method further comprises applying a ranking loss to a plurality of query features generated by the embedding network to produce improved visually discriminating features.

19. The non-transitory computer-readable medium of claim 18, wherein the method further comprises optimizing an end-to-end neural network including the feature extraction network, the spatial feature extraction network and the embedding network by using at least one of training datasets, pipelines and augmentations to train the end-to-end neural network.

20. The non-transitory computer-readable medium of claim 19, wherein the optimizing includes training using at least one of open examples, closed examples and random patches.

21. The non-transitory computer-readable medium of claim 18, wherein the method further comprises a training process including mining negative and positive examples from both unlabeled and labeled data to optimize the localization loss and the ranking loss.

22. The non-transitory computer-readable medium of claim 16, wherein the spatial feature neural network comprises a feature pyramid network.

23. The non-transitory computer-readable medium of claim 22, wherein the embedding network comprises a fully connected network.

* * * * *